United States Patent
Goto (10) Patent No.: US 11,477,830 B2
(45) Date of Patent: Oct. 18, 2022

(54) COMMUNICATION APPARATUS, METHOD FOR CONTROLLING COMMUNICATION APPARATUS, AND COMPUTER PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/000,577

(22) Filed: Jun. 5, 2018

(65) Prior Publication Data

US 2018/0295661 A1 Oct. 11, 2018

Related U.S. Application Data

(63) Continuation of application No. 14/768,427, filed as application No. PCT/JP2014/000807 on Feb. 17, 2014, now Pat. No. 10,015,827.

(30) Foreign Application Priority Data

Feb. 22, 2013 (JP) .............................. JP2013-033419

(51) Int. Cl.

| | |
|---|---|
| *H04W 76/14* | (2018.01) |
| *H04W 76/38* | (2018.01) |
| *H04W 84/12* | (2009.01) |
| *H04L 67/06* | (2022.01) |
| *H04W 4/029* | (2018.01) |
| *H04W 84/18* | (2009.01) |

(Continued)

(52) U.S. Cl.
CPC ............. *H04W 76/14* (2018.02); *H04L 67/06* (2013.01); *H04W 76/38* (2018.02); *H04W 84/12* (2013.01); *H04W 4/029* (2018.02); *H04W 12/06* (2013.01); *H04W 76/30* (2018.02); *H04W 84/18* (2013.01)

(58) Field of Classification Search
CPC ....... H04W 76/14; H04W 4/02; H04W 76/30; H04W 76/38; H04W 84/12; H04W 84/18; H04W 76/023; H04L 67/06
See application file for complete search history.

(56) References Cited

U.S. PATENT DOCUMENTS

| | | | |
|---|---|---|---|
| 6,304,642 B1 * | 10/2001 | Beamish ............... | H04M 1/573 379/142.01 |
| 6,404,868 B1 * | 6/2002 | Beamish ............... | H04M 1/573 379/142.04 |

(Continued)

*Primary Examiner* — Steven H Nguyen
(74) *Attorney, Agent, or Firm* — Canon U.S.A., Inc. I.P. Division (57) ABSTRACT

A communication apparatus determines whether the communication apparatus is to operate as a transmission apparatus for transmitting service data to be transferred by a service performed via a network, or operate as both the transmission apparatus for transmitting the service data to be transferred by the service performed via the network and a reception apparatus for receiving the service data to be transferred by the service performed via the network, terminates a connection with a communication partner apparatus in response to completion of transmission of the service data if the communication apparatus operates as the transmission apparatus, and terminates the connection with the communication partner apparatus in response to a user operation if the communication apparatus operates as both the transmission apparatus and the reception apparatus.

8 Claims, 10 Drawing Sheets

(51) Int. Cl.
*H04W 76/30* (2018.01)
*H04W 12/06* (2021.01)

(56) References Cited

U.S. PATENT DOCUMENTS

| | | | |
|---|---|---|---|
| 10,015,827 B2* | 7/2018 | Goto | H04W 84/12 |
| 2006/0221915 A1* | 10/2006 | Gatta | H04W 84/18 |
| | | | 370/338 |
| 2008/0043110 A1* | 2/2008 | Aizawa | H04N 5/232939 |
| | | | 348/211.2 |
| 2008/0151847 A1* | 6/2008 | Abujbara | G06F 21/629 |
| | | | 370/338 |
| 2011/0116415 A1* | 5/2011 | Naito | H04W 8/005 |
| | | | 370/254 |
| 2012/0077432 A1* | 3/2012 | Rose | H04B 5/0062 |
| | | | 455/41.1 |
| 2012/0214413 A1* | 8/2012 | Rose | H04L 63/18 |
| | | | 455/41.1 |
| 2012/0317194 A1* | 12/2012 | Tian | H04W 8/005 |
| | | | 709/204 |
| 2013/0067094 A1* | 3/2013 | Madhusudan | G06F 3/122 |
| | | | 709/227 |
| 2013/0223361 A1* | 8/2013 | Park | H04W 12/06 |
| | | | 370/329 |
| 2015/0117318 A1* | 4/2015 | Qi | H04W 76/18 |
| | | | 370/329 |

* cited by examiner

REMOTE SCREEN OF STA-B
LCD SCREEN OF STA-A

COMMUNICATION APPARATUS, METHOD FOR CONTROLLING COMMUNICATION APPARATUS, AND COMPUTER PROGRAM

RELATED APPLICATIONS

This application is a continuation of U.S. patent application Ser. No. 14/768,427 filed on Aug. 17, 2015, which is a National Stage application pursuant to 35 U.S.C. 371, of International Patent Application No. PCT/JP2014/000807, filed Feb. 17, 2014. These applications both claim the benefit of Japanese Application No. 2013-033419, filed Feb. 22, 2013. The above applications are hereby incorporated by reference herein in their entirety.

TECHNICAL FIELD

The present invention relates to a communication apparatus, a method for controlling the communication apparatus, and a computer program.

BACKGROUND ART

In recent years, more and more electronic apparatuses, such as digital cameras or printers, have been equipped with a wireless local area network (LAN) station function and used as communication apparatuses by connecting to a wireless LAN. For example, Japanese Patent Application Laid-Open No. 2011-35768 discusses a method in which a digital camera is equipped with a wireless LAN function to facilitate image sharing.

Further, a standard called Wi-Fi Direct (registered trademark) is established by Wi-Fi Alliance. In Wi-Fi Direct, a protocol for determining whether each electronic apparatus operates as either a wireless LAN access point or a wireless LAN station is defined. By implementing the protocol, which electronic apparatus is to operate as the wireless LAN access point and which electronic apparatus is to operate as the wireless LAN station can be automatically determined, so that user convenience is enhanced.

Further, in Wi-Fi Direct, a function of advertising and searching for service information supported by a higher-order application (service discovery function) is defined as an optional function. The service discovery function allows, before executing connection processing, an electronic apparatus to obtain the service information stored in an electronic apparatus to be connected thereto. Accordingly, user convenience is enhanced.

The user can execute wireless LAN connection processing and service connection processing as an operation sequence simply by selecting the service the user desires to use.

However, various kinds of services are provided via a network, and when a service will end cannot always be identified.

SUMMARY OF INVENTION

The present invention is directed to terminating a connection with a communication partner apparatus according to a service.

According to an aspect of the present invention, a communication apparatus includes a transmission means for transmitting service data to be transferred by a service performed via a network, a reception means for receiving the service data to be transferred by the service performed via the network, a determination means for determining whether the communication apparatus is to operate as a transmission apparatus on a transmitting side where the service data is transmitted by the transmission means, or operate as both the transmission apparatus on the transmitting side where the service data is transmitted by the transmission means and a reception apparatus on a receiving side where the service data is received by the reception means, and a disconnection means for terminating a connection with a communication partner apparatus, wherein if the communication apparatus operates as the transmission apparatus, the disconnection means terminates the connection with the communication partner apparatus in response to completion of transmission of the service data, and if the communication apparatus operates as both the transmission apparatus and the reception apparatus, the disconnection means terminates the connection with the communication partner apparatus in response to a user operation.

According to another aspect of the present invention, a communication apparatus includes a transmission means for transmitting service data to be transferred by a service performed via a network, a reception means for receiving the service data to be transferred by the service performed via the network, a determination means for determining whether the communication apparatus is to operate as a reception apparatus on a receiving side where the service data is received by the reception means, or operate as both a transmission apparatus on a transmitting side where the service data is transmitted by the transmission means and the reception apparatus on the receiving side where the service data is received by the reception means, and a disconnection means for terminating a connection with a communication partner apparatus, wherein if the communication apparatus operates as the reception apparatus, the disconnection means terminates the connection with the communication partner apparatus in response to completion of reception of the service data, and if the communication apparatus operates as both the transmission apparatus and the reception apparatus, the disconnection means terminates the connection with the communication partner apparatus in response to a user operation.

Further features of the present invention will become apparent from the following description of exemplary embodiments with reference to the attached drawings.

DESCRIPTION OF EMBODIMENTS

Various exemplary embodiments, features, and aspects of the invention will be described in detail below with reference to the drawings. Although an example will be described below where communication apparatuses perform wireless communication using the wireless LAN system defined by the IEEE 802.11 series of standards, the communication method to be used is not limited to the wireless LAN conforming to IEEE 802.11.

First, a hardware configuration of a communication apparatus according to a first exemplary embodiment of the present invention will be described.

Figure 1:
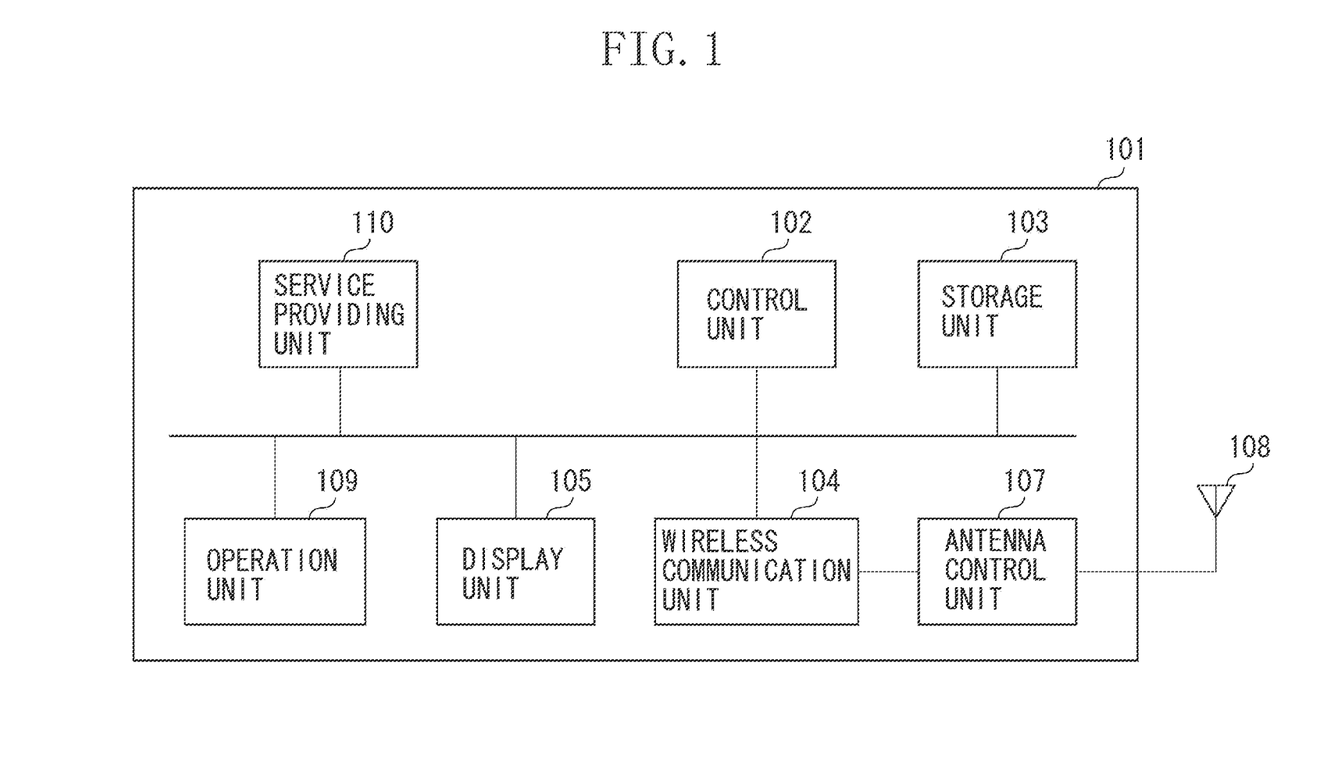
FIG. 1 is a block diagram of a configuration of a communication apparatus.

FIG. 1 is a block diagram illustrating an example of a configuration of each communication apparatus to be described below according to the first exemplary embodiment. A communication apparatus 101 includes various units. A control unit 102 controls the entire communication apparatus 101 by executing a control program stored in a storage unit 103. The control unit 102 also controls setting of communication parameters to be used for communication with other apparatuses. The storage unit 103 stores a control program executed by the control unit 102 and various types of information such as the communication parameters. Various operations to be described below are realized by the control unit 102 executing a control program stored in the storage unit 103.

A wireless communication unit 104 performs wireless LAN communication which conforms to the IEEE 802.11 series of standards. A display unit 105 performs various types of display. The display unit 105 has a function of outputting visually-recognizable information, such as a liquid crystal display (LCD) or a light-emitting diode (LED), or a function of outputting audio such as a speaker. The display unit 105 has a function of outputting at least either visual information or audio information. The communication apparatus 101 further includes an antenna control unit 107 and an antenna 108. An operation unit 109 is used by a user to perform various inputs to operate the communication apparatus 101.

A service providing unit 110 has a function that provides application-level service information provided by the communication apparatus 101. For example, if the communication apparatus 101 is a printer, the service providing unit 110 provides a printing function, and the communication apparatus 101 prints out document data and image data received via the antenna 108 and the wireless communication unit 104. Further, if the communication apparatus 101 is a digital camera, the service providing unit 110 provides an imaging function, and the image captured by the imaging function can be transmitted to another apparatus as transmission data. The service providing unit 110 may provide both the printing function and the imaging function, or may also provide other functions including a telephone function, a wireless communication function of a third-generation (3G) telephone, a wireless communication function of a GSM (registered trademark) telephone, and an electronic mail function. Further, the service providing unit 110 may have a function that provides time information and position information to a communication partner apparatus and receives such information from the communication partner apparatus using the global positioning system (GPS), a function that enables position information to be added to a captured image, and a function that enables an image, such as a captured image, to be shared among a plurality of apparatuses. The service providing unit 110 can operate as a service providing unit 208 which provides a service as well as a service using unit 209 which uses the service, which will be described below.

Figure 2:
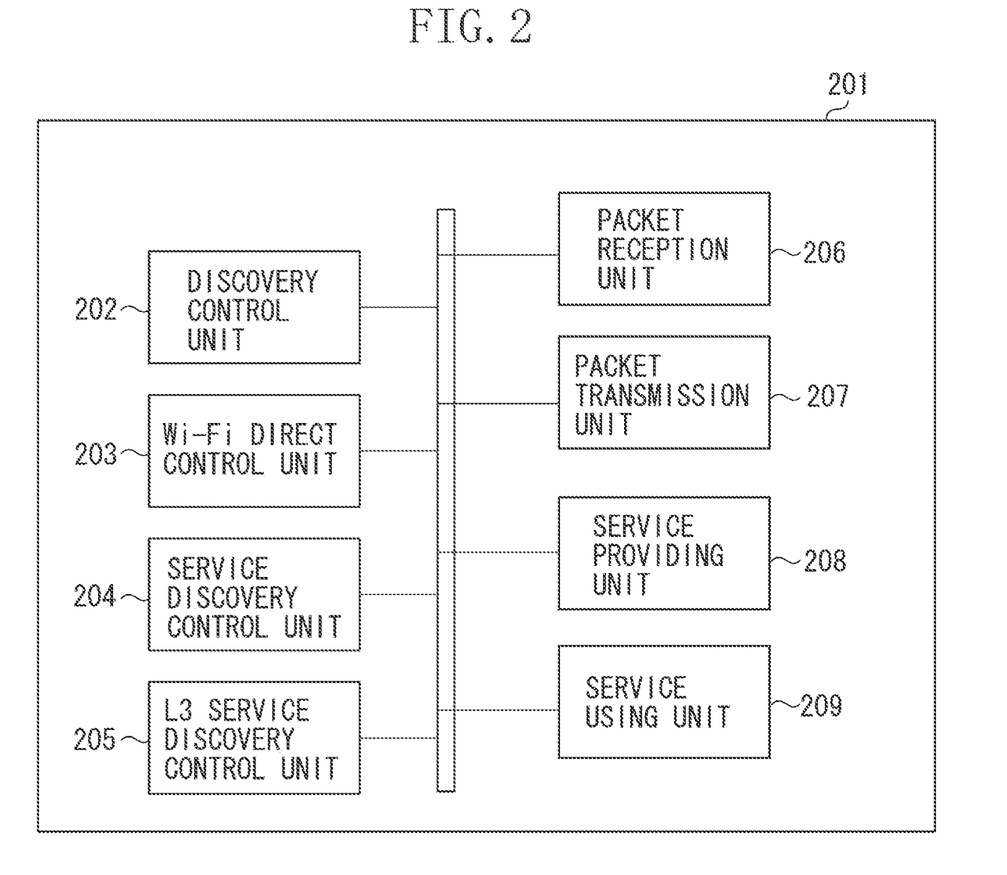
FIG. 2 is a block diagram of software functions in the communication apparatus.

FIG. 2 is a block diagram illustrating an example of a configuration of software functional blocks which execute a communication control function to be described below. Software functional blocks 201 include various units. A discovery control unit 202 performs processing for searching for a communication apparatus that can serve as a communication partner apparatus, which will be described below.

A Wi-Fi Direct control unit 203 performs control based on a Wi-Fi Direct protocol specification. According to the Wi-Fi Direct specification, a communication apparatus which serves as a wireless LAN access point is called a P2P Group Owner (GO) and a communication apparatus which serves as a wireless LAN station is called a P2P Client (CL). Such roles are determined by a protocol for GO Negotiation and are defined by the Wi-Fi Direct specification. In the Wi-Fi Direct specification, a network established by a Group Owner is called a P2P group. The network to be described below is a P2P group. A Group Owner provides a Client with communication parameters. Then, the Group Owner and the Client are connected to each other using the communication parameters. The communication parameters include various kinds of wireless communication parameters for wireless communication conforming to the IEEE 802.11 standard. More specifically, the communication parameters include wireless communication parameters necessary to perform wireless LAN communication, such as a service set identifier (SSID) as a network identifier, an encryption method, an encryption key, an authentication method, and an authentication key. Further, the communication parameters include an internet protocol (IP) address to be used for communication on the IP layer. If the communication apparatus 101 operates as a Group Owner, the wireless communication unit 104 establishes a wireless network as a Group Owner and a Client is connected to the Group Owner by wireless LAN. The wireless network is established using the network identifier, encryption method, encryption key, authentication method, authentication key, and frequency channel that are specified by the Group Owner. The encryption key to be used for encrypted communication is determined by encryption key sharing processing which is performed by the Group Owner and the Client when the Group Owner authenticates the Client for wireless connection. A P2P Group Owner (GO), a P2P Client (CL), and a communication apparatus, which has not yet been given a defined role, are collectively called a P2P device.

A service discovery control unit 204 controls a service discovery function to be described below. The service discovery function allows a communication apparatus to exchange service information with a partner communication apparatus by transmitting and receiving an action frame specified by IEEE 802.11. More specifically, a communication apparatus transmits a Service Discovery (SD) query to a partner communication apparatus and receives a SD response as a response. Alternatively, the communication apparatus receives a SD query from the partner communication apparatus and transmits a SD response as a response. The service information exchanged between the communication apparatuses includes protocol information to be used when the apparatuses mutually execute the service communication, and service function information that indicates the essential and optional functions supported by the service. For example, if the target apparatus is a printer, information on whether the printer can support two-sided printing, color or monochrome printing, or format printing can be provided or acquired as the service function information. The examples described above shall not be construed as limiting the present invention. These examples are simply given to enhance the understanding.

An L3 Service Discovery control unit 205 controls a service discovery function on the network layer (layer 3) of the open systems interconnection (OSI) reference model. This service discovery function can be executed by using a technique such as Universal Plug and Play (UPnP) (registered trademark) or Bonjour (registered trademark). A packet reception unit 206 and a packet transmission unit 207 control transmission and reception of all packets including an upper layer communication protocol.

The service providing unit 208 provides services on the application layer. The application layer is a service providing layer in the fifth and upper layers of the OSI reference model. Specifically, the service providing unit 208 provides functions such as a printing function, an image streaming function, and a file transfer function. The services provided via a network, which will be described below, are provided by the service providing unit 208.

The service using unit 209 uses services on the application layer. The service using unit 209 uses the services provided by a service providing unit on the application layer of the communication partner apparatus. More specifically, the service using unit 209 controls a function of transmitting a print product to a print service providing apparatus, a function of transmitting a moving image to a digital display, and the like. The services provided via a network to be described below are used by the service using unit 209.

All the functional blocks are associated with each other software or hardware wise. Further, the above-described functional blocks are used as an example. A plurality of functional blocks in this example may be configured to form one functional block, or a functional block may be further divided into a plurality of functional blocks.

Figure 3:
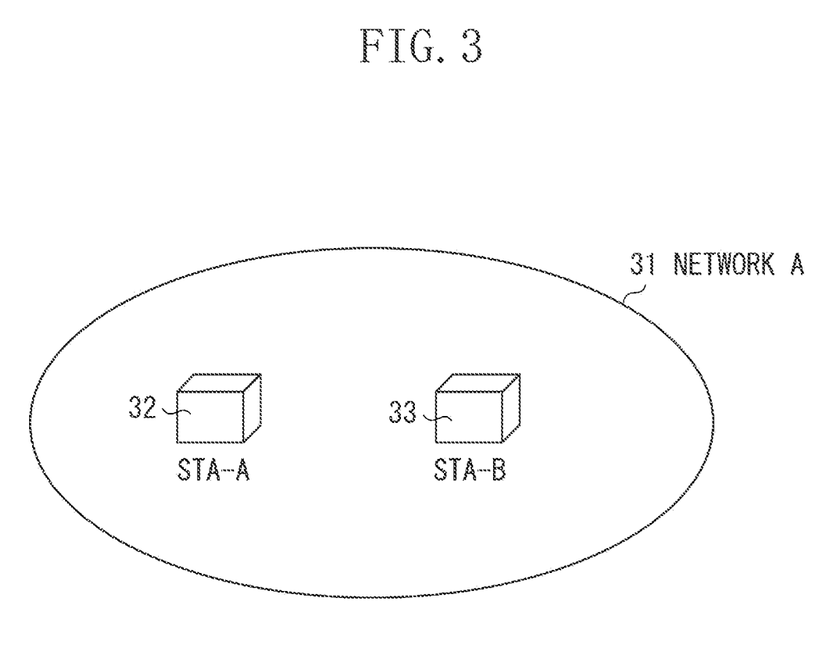
FIG. 3 illustrates an example of a network configuration according to a first exemplary embodiment of the present invention.

FIG. 3 illustrates a network A31 (hereinafter referred to as a network A) which includes a communication apparatus A32 (hereinafter referred to as a STA-A) and a communication apparatus B33 (hereinafter referred to as a STA-B). These apparatuses have the configuration described above with reference to FIGS. 1 and 2.

In the first exemplary embodiment, service search processing and connection processing on the wireless LAN layer, which are performed when the STA-A serving as a digital camera executes a service for transmitting service data via a network, will be described. The STA-A executes a geotag acquisition service, an image transfer service, and a simultaneously-captured image sharing service, and performs connection processing on the wireless LAN layer. The geotag acquisition service is used for acquiring position information and adding the acquired position information to an image. The image transfer service is used for transferring an image. The simultaneously-captured image sharing service is used for sharing an image between apparatuses. If the STA-A uses the geotag acquisition service, the STA-A is connected to the STA-B serving as a GPS logger by wireless LAN. Further, if the STA-A uses the geotag acquisition service, the STA-A operates as a reception apparatus which receives and acquires position information as the service data of the geotag acquisition service. Furthermore, if the STA-A uses the geotag acquisition service, the STA-B operates as a transmission apparatus which transmits position information as the service data.

If the STA-A uses the image transfer service, the STA-A is connected to the STA-B serving as a cellular phone or a smartphone by wireless LAN. Further, if the STA-A uses the image transfer service, the STA-A operates as a transmission apparatus which transmits image data or an image file, which is transmitted as the service data of the image transfer service. Furthermore, if the STA-A uses the image transfer service, the STA-B operates as a reception apparatus which receives image data or an image file, which is transmitted as the service data of the image transfer service.

If the STA-A uses the simultaneously-captured image sharing service, the STA-A is connected to the STA-B serving as a digital camera by wireless LAN. Further, if the STA-A uses the simultaneously-captured image sharing service, the STA-A operates as both a transmission apparatus for transmitting image data or an image file, which is the service data of the simultaneously-captured image sharing service, and a reception apparatus for receiving the image data or the image file.

Figure 4:
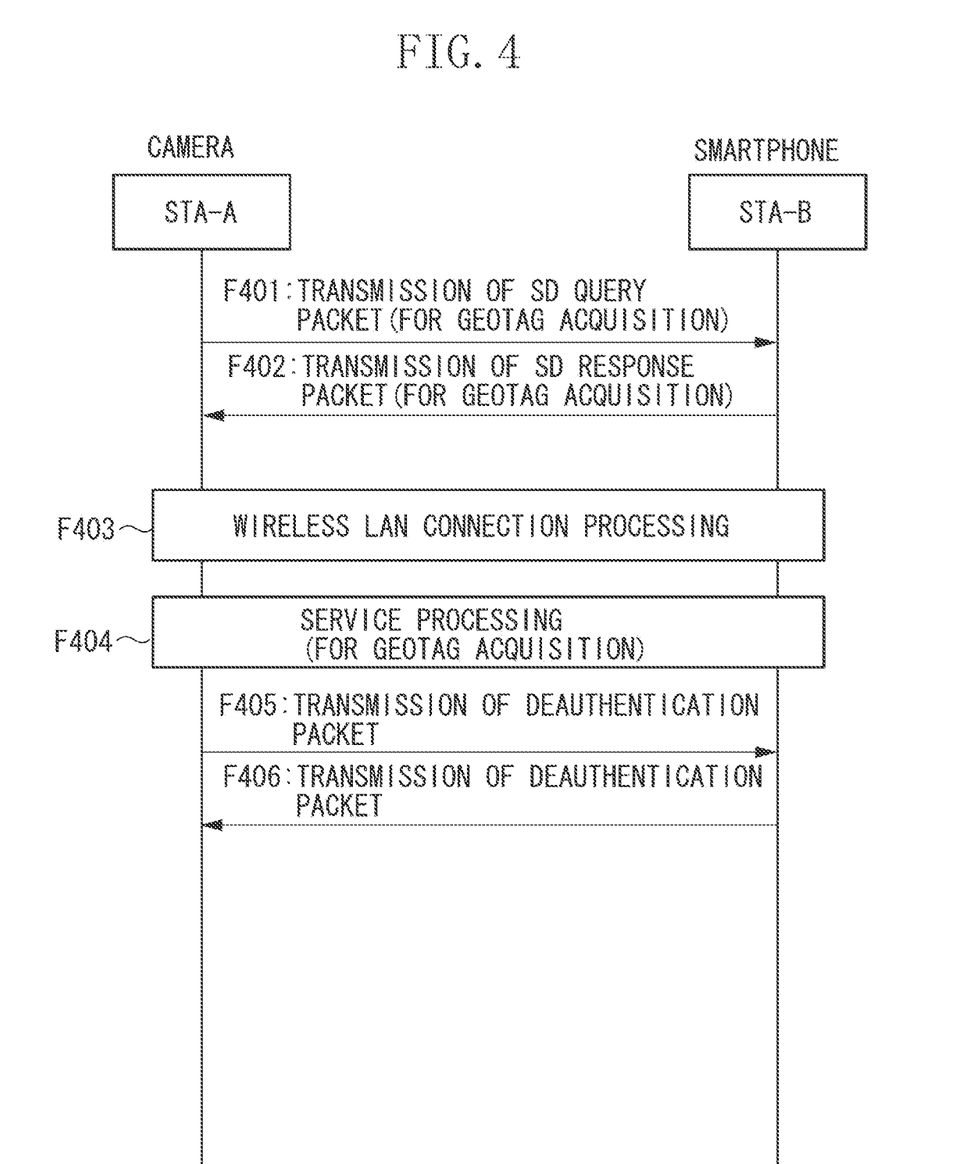
FIG. 4 is an operation sequence diagram according to the first exemplary embodiment.

FIG. 4 is an operation sequence diagram illustrating the geotag acquisition service as an example of a service on the application layer.

In FIG. 4, the STA-A is a digital camera and the STA-B is a GPS logger. The GPS logger is an apparatus for recording a moving path using the GPS. The STA-A records the shooting date and time each time an image is captured. The STA-B records the date and time and the moving path as GPS information. When the geotag acquisition service is started by the STA-A and the STA-B, the STA-A and the STA-B are connected to each other to synchronize the data, so that geotag information can be added to each captured image. In this context, the geotag information is position information on the latitude and longitude of the shooting location as additional information of the captured image.

First, the digital camera (STA-A) searches for the GPS logger (STA-B) using the service discovery processing defined by the Wi-Fi Direct specification. Specifically, the STA-A transmits a SD query packet that specifies the geotag acquisition service to the STA-B (F401).

Here, it is assumed that the STA-B supports the geotag acquisition service specified in the SD query packet transmitted from the STA-A. Thus, the STA-B adds information indicating that the STA-B supports the geotag acquisition service to a SD response packet, and transmits the SD response packet to the STA-A (F402).

Since the service information has been determined in F401 and F402, wireless LAN connection processing is performed (F403). In the wireless LAN connection processing, a predetermined protocol for determining a Group Owner and a Client is executed by the control of the Wi-Fi Direct control unit 203. As a result of the execution of the protocol, one apparatus is determined to serve as a Group Owner and the other apparatus is determined to serve as a Client. Further, the Group Owner provides the Client with communication parameters, and the apparatuses are connected to each other by wireless LAN. If the Group Owner has already been determined before the connection processing is performed, the Group Owner that has already been operating as a Group Owner provides the Client with communication parameters and the apparatuses are connected to each other by wireless LAN. When the connection on the wireless LAN layer has been completed, the geotag acquisition service is executed (F404).

The geotag acquisition service allows a camera to obtain a corresponding set of GPS information and time information from a GPS logger based on the shooting time of the images stored in the camera. More specifically, the service using unit 209 of the STA-A requests the service providing unit 208 of the STA-B to transmit a set of GPS information and time information corresponding to the images. At this time, the service using unit 209 notifies the service providing unit 208 of the shooting time of the images. More specifically, the service using unit 209 provides the service providing unit 208 with the shooting time of all the images stored in the storage unit 103 of the STA-A, or with the shooting time of an image that does not have GPS information added or an image that is specified by the user. Then, the service providing unit 208 transmits the GPS information corresponding to the provided shooting time to the service using unit 209.

When the service using unit 209 of the STA-A determines that the corresponding set of the GPS information and time information has been obtained, the service using unit 209 instructs the Wi-Fi Direct control unit 203 to perform wireless LAN disconnection processing to terminate the wireless LAN connection. Specifically, the STA-A transmits a deauthentication packet to the STA-B (F405). When receiving the deauthentication packet, the STA-B transmits a deauthentication packet to the STA-A as a response (F406).

Figure 5:
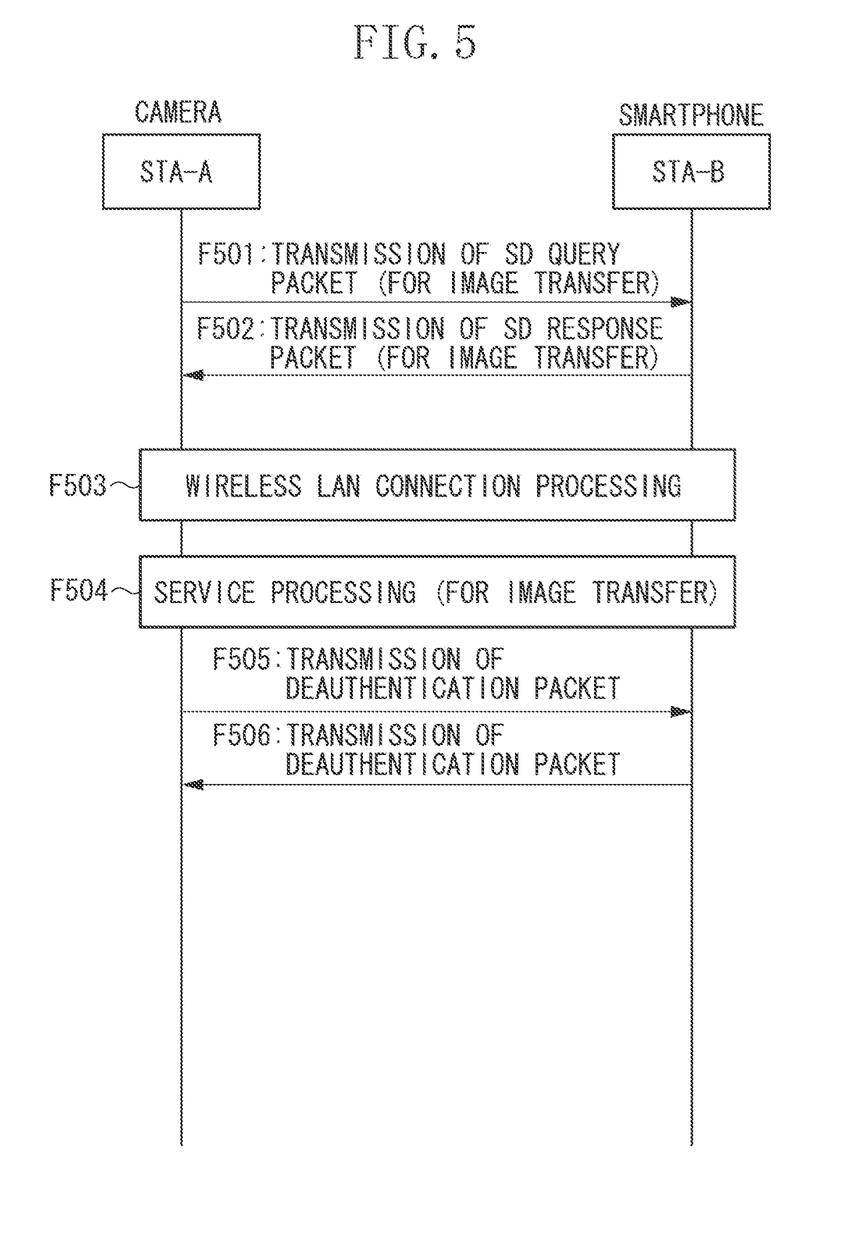
FIG. 5 is another operation sequence diagram according to the first exemplary embodiment.

FIG. 5 is an operation sequence diagram illustrating the image transfer service as an example of a service on the application layer. In FIG. 5, it is assumed that the STA-A is a digital camera and the STA-B is a smartphone. The STA-A transfers a desired image to the smartphone, so that an image captured by the digital camera can be used as a wallpaper of the smartphone.

The digital camera (STA-A) searches for a cellular phone or a smartphone (STA-B) using the service discovery processing defined by the Wi-Fi Direct specification. Specifically, the STA-A transmits a SD query packet that specifies the image transfer service to the STA-B (F501).

Since the STA-B supports the image transfer service specified in the SD query packet transmitted from the STA-A, the STA-B adds information indicating that the STA-B supports the image transfer service to a SD response packet, and transmits the SD response packet to the STA-A (F502).

Since the service information has been determined in F501 and F502, wireless LAN connection processing is performed (F503). In the wireless LAN connection processing, a predetermined protocol for determining a Group Owner and a Client is executed by the control of the Wi-Fi Direct control unit 203. As a result of the execution of the protocol, one apparatus is determined to serve as a Group Owner and the other apparatus is determined to serve as a Client. Further, the Group Owner provides the Client with communication parameters, and the apparatuses are connected to each other by wireless LAN. If the Group Owner has already been determined before the connection processing is performed, the Group Owner which has already been operating as a Group Owner provides the Client with communication parameters and the apparatuses are connected to each other by wireless LAN. When the connection on the wireless LAN layer has been completed, the image transfer service is executed (F504).

The image transfer service allows a camera to transfer the image data or an image file stored therein to a partner communication apparatus such as a smartphone according to a user's instruction. Specifically, the service using unit 209 of the STA-A transfers image data or an image file to the service providing unit 208 of the STA-B. The image data or image file to be transferred may be a still image or a moving image. The image data or image file to be transferred is specified by a user operation.

When the service using unit 209 of the STA-A determines that transfer of the specified image data or image file has been completed, the service using unit 209 instructs the Wi-Fi Direct control unit 203 to perform wireless LAN disconnection processing to terminate the wireless LAN connection. Specifically, the STA-A transmits a deauthentication packet to the STA-B (F505). When receiving the deauthentication packet, the STA-B transmits a deauthentication packet to the STA-A as a response (F506).

Figure 6:
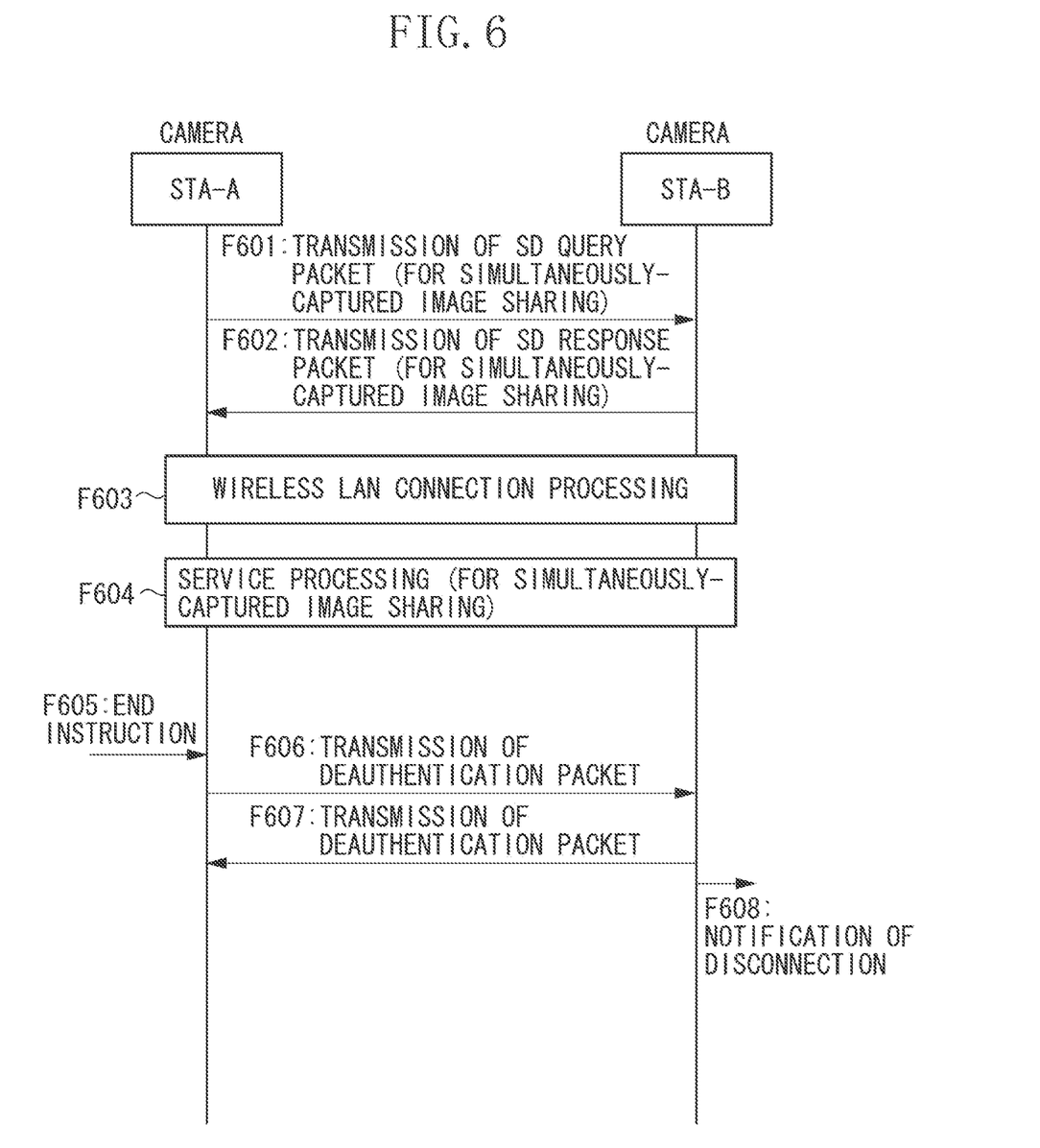
FIG. 6 is yet another operation sequence diagram according to the first exemplary embodiment.

FIG. 6 is an operation sequence diagram illustrating the simultaneously-captured image sharing service as an example of a service on the application layer. In FIG. 6, it is assumed that both the STA-A and the STA-B are digital cameras. The simultaneously-captured image sharing service allows the STA-A and STA-B to share captured images and obtain multiangle images. During the simultaneously-captured image sharing service, the STA-A and the STA-B transfer image data or an image file which is displayed on the display unit 105 to the apparatus being an image sharing partner. When the apparatus as an image sharing partner has received the displayed image data or the displayed image file, the apparatus displays the received image along with an image being captured by its image-capture unit. If the apparatus that has received the displayed image has already been viewing an image stored in the storage unit 103, the received displayed image is displayed together with the image being viewed. Further, during the simultaneously-captured image sharing service, if an image is captured, the STA-A and the STA-B store the captured image in the storage unit 103 as well as transfer image data or an image file of the captured image to the apparatus being an image sharing partner. The apparatus as an image sharing partner that has received the captured image displays the received captured image on the display unit 105 for a predetermined period of time. In the simultaneously-captured image sharing service, since each of the apparatuses (the STA-A and the STA-B) that share the image operates as described above, the STA-A and the STA-B can display the image almost simultaneously. Further, the captured image can be shared almost at the same time as when the image has been captured.

Figure 10:
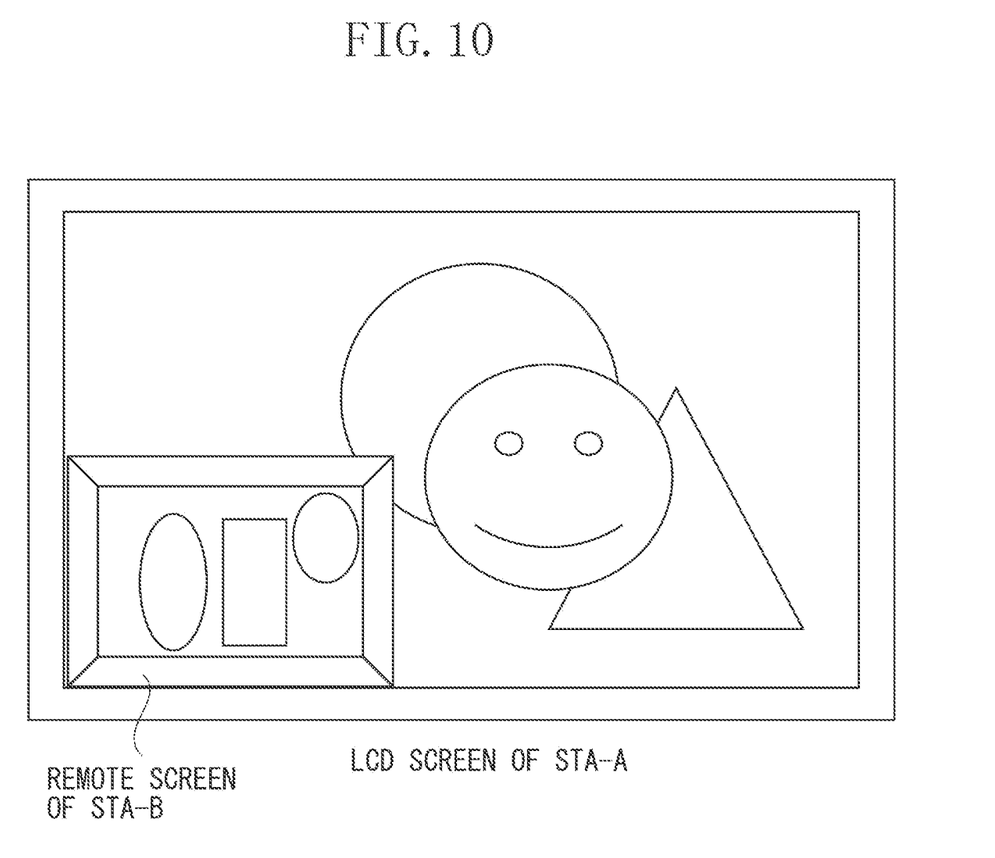
FIG. 10 is an image diagram illustrating a simultaneously-captured image sharing service according to the first exemplary embodiment.

FIG. 10 is an image diagram of the above-described example. In this service, the remote screen of the display unit 105 of the STA-B is displayed on the screen of the display unit of the STA-A. In the first exemplary embodiment, since the remote screen of the STA-B is displayed, the user of the STA-A can also remotely operate the STA-B via the display unit of the STA-A. For example, the user can click the shutter of the STA-B via the display unit of the STA-A.

In FIG. 6, the digital camera (STA-A) searches for another digital camera (STA-B) using the service discovery processing defined by the Wi-Fi Direct specification. Specifically, the STA-A transmits a SD query packet that specifies the image transfer service to the STA-B (F601). Here, it is assumed that the STA-B supports the simultaneously-captured image sharing service specified in the SD query packet transmitted from the STA-A. Thus, the STA-B adds information indicating that the STA-B supports the simultaneously-captured image sharing service to a SD response packet, and transmits the SD response packet to the STA-A (F602).

Since the service information has been determined in F601 and F602, wireless LAN connection processing is performed (F603). In the wireless LAN connection processing, a predetermined protocol for determining a Group Owner and a Client is executed by the control of the Wi-Fi Direct control unit 203. As a result of the execution of the protocol, one apparatus is determined to serve as a Group Owner and the other apparatus is determined to serve as a Client. Further, the Group Owner provides the Client with communication parameters, and the apparatuses are connected to each other by wireless LAN. If the Group Owner has already been determined before the connection processing is performed, the Group Owner which has already been operating as a Group Owner provides the Client with communication parameters, and the apparatuses are connected to each other by wireless LAN. When the connection on the wireless LAN layer has been completed, the simultaneously-captured image sharing service is executed (F604).

The simultaneously-captured image sharing service allows the image data or image file acquired by capturing an image according to an user's instruction to be transferred to a partner communication apparatus such as a digital camera. Thus, the service using unit 209 of the STA-A cannot identify when the image will be transferred from the service providing unit 208 of the STA-B, which is an image sharing partner of the STA-A. Thus, if the service using unit 209 of the STA-A uses the simultaneously-captured image sharing service, the service using unit 209 determines the completion of the service according to the user operation. Similarly, if the service using unit 209 of the STA-B uses the simultaneously-captured image sharing service, the service using unit 209 determines the completion of the service according to the user operation.

More specifically, if the user issues a service end instruction by operating the operation unit 109, the service using unit 209 of the STA-A detects the operation (F605). When the service using unit 209 of the STA-A has detected the operation to end the above-described service, the STA-A transmits a deauthentication packet to the STA-B (F606). When receiving the deauthentication packet, the STA-B transmits a deauthentication packet to the STA-A as a response (F607).

Further, the STA-B which has received the deauthentication packet displays, on the display unit 105, a message informing the user that the simultaneously-captured image sharing service has ended and the wireless LAN has been disconnected (F608).

As described above, according to the service executed on the application layer, whether the disconnection processing is automatically performed after the service has been completed or is performed according to the user's instruction is determined.

Figure 7:
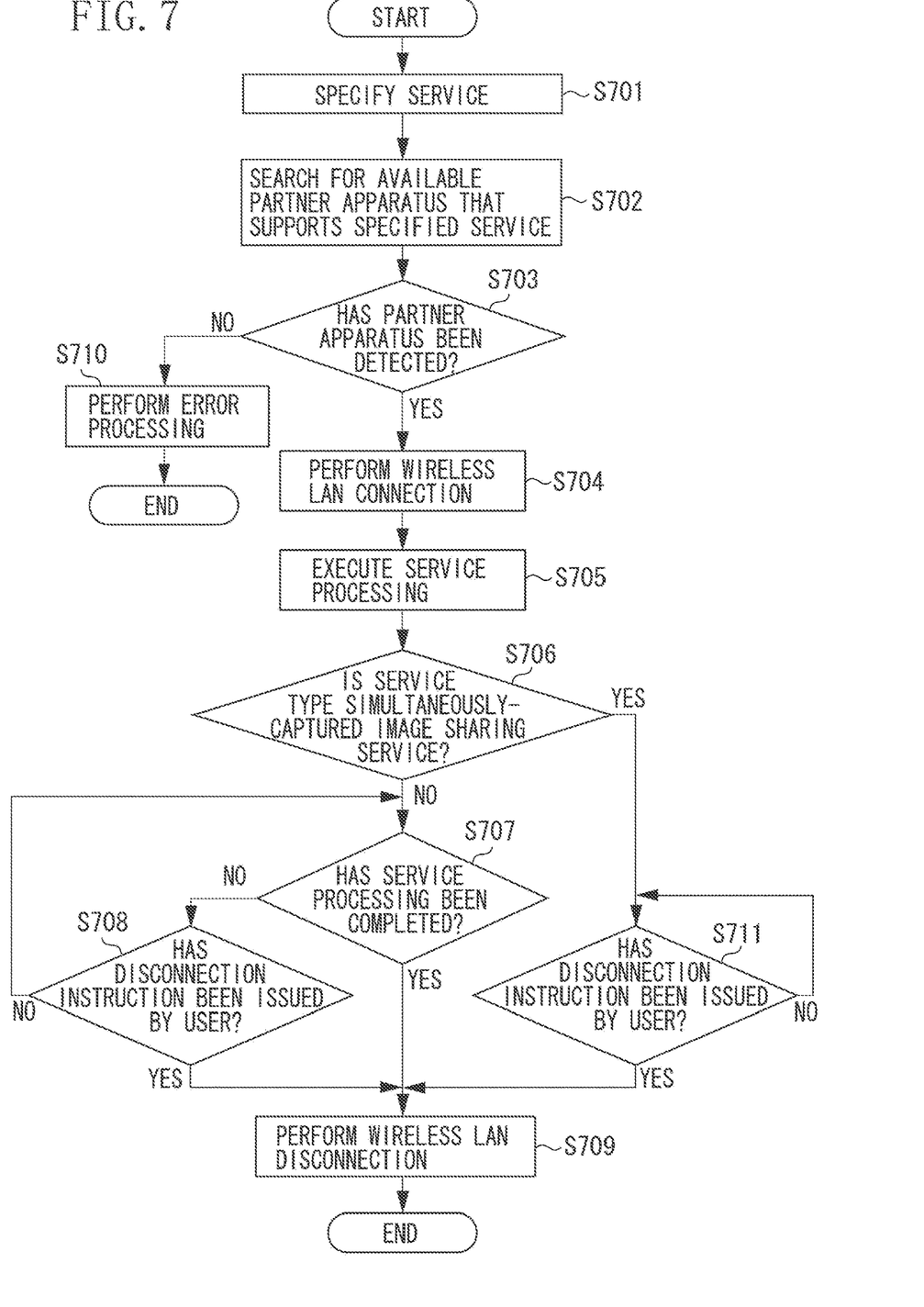
FIG. 7 is a flowchart illustrating operation performed by the communication apparatus according to the first exemplary embodiment.

FIG. 7 is a flowchart illustrating an example of the operation performed by the STA-A described with reference to FIGS. 4, 5, and 6. In step S701, the user specifies the service to be used. In step S702, the control unit 102 searches for any available partner apparatus that supports the specified service. In step S703, the control unit 102 determines whether the partner apparatus that supports the specified service has been detected. If such a partner apparatus does not exist (NO in step S703), the processing proceeds to step S710. In step S710, the control unit 102 performs error processing. Then, the processing is ended.

On the other hand, in step S703, if the partner apparatus that supports the specified service has been detected (YES in step S703), the processing proceeds to step S704. In step S704, the control unit 102 performs the connection processing on the wireless LAN layer as described above. In step S705, the control unit 102 executes the service processing on the application layer. Here, if the service type is the image transfer service, the processing is continued until all the image data or all the image files specified by the user have been transferred. If the service type is the geotag acquisition service, the processing is continued until all the GPS information as the position information necessary for the images stored in the camera has been acquired. In step S706, the control unit 102 determines whether the service type is the simultaneously-captured image sharing service. If the service type is the image transfer service (NO in step S706), the processing proceeds to step S707. In step S707, the control unit 102 determines whether the service processing has been completed. If the control unit 102 determines that transfer of all the image data or all the image files specified by the user has been completed (YES in step S707), the processing proceeds to step S709. In step S709, the control unit 102 disconnects the wireless LAN, and then the processing is ended. In step S706, if the service type is the geotag acquisition service (NO in step S706), the processing proceeds to step S707. In step S707, if the control unit 102 determines that all the GPS information necessary for the images stored in the camera has been acquired (YES in step S707), the processing proceeds to step S709. In step S709, the control unit 102 disconnects the wireless LAN, and then the processing is ended. In step S708, the control unit 102 determines whether a disconnection instruction has been issued by the user. If the control unit 102 determines that a disconnection instruction has been issued by the user (YES in step S708), the processing proceeds to step S709. If the control unit 102 determines that a disconnection instruction has not been issued by the user (NO in step S708), the processing returns to step S707. Thus, when the image transfer service or the geotag acquisition service is performed, if a disconnection instruction has been issued by the user before the completion of the service, the wireless LAN is disconnected and the processing is ended.

In step S706, if the service type is the simultaneously-captured image sharing service (YES in step S706), the processing proceeds to step S711. In step S711, the control unit 102 determines whether a disconnection instruction has been issued by the user. If a disconnection instruction has been issued by the user (YES in step S711), the processing proceeds to step S709. In step S709, the control unit 102 disconnects the wireless LAN, and then the processing is ended.

On the other hand, in step S711, if a disconnection instruction has not been issued by the user (NO in step S711), the control unit 102 continues the simultaneously-captured image sharing service.

According to the first exemplary embodiment, if the service has a clear end condition, the wireless LAN disconnection processing can be automatically performed after the completion of the service. On the other hand, if the service does not have a clear end condition and the end condition is based on the determination of the user, the apparatus waits for a disconnection instruction or an end instruction from the user.

The geotag acquisition service, the image transfer service, and the simultaneously-captured image sharing service are described as examples of the service according to the first exemplary embodiment. However, the service is not limited thereto. The geotag acquisition service and the image transfer service are used as examples of the service having a clear end condition, and the simultaneously-captured image sharing service is used as an example of the service which is determined to be completed by the user.

For example, if a Push service is used, the completion of the service can be determined when the transmission apparatus for transmitting the service data determines that transmitting the service data has been completed. Further, if a Pull service is used, the completion of the service can be determined when the reception apparatus for receiving the service data determines that receiving or acquiring the service data has been completed. Further, the service data is not limited to image data or an image file of a still image or a moving image, or position information. The service data may be file data of a document file or print data.

In the first exemplary embodiment, an example has been described, where whether to terminate the wireless LAN connection when the service has been completed is determined according to the service type used by the communication apparatus. In a second exemplary embodiment of the present invention, an example will be described, where instead of specifying the service type, the transmission/reception direction of service data is specified for executing the service. A communication apparatus according to the second exemplary embodiment also has the configuration described above with reference to FIGS. 1 and 2.

Figure 8:
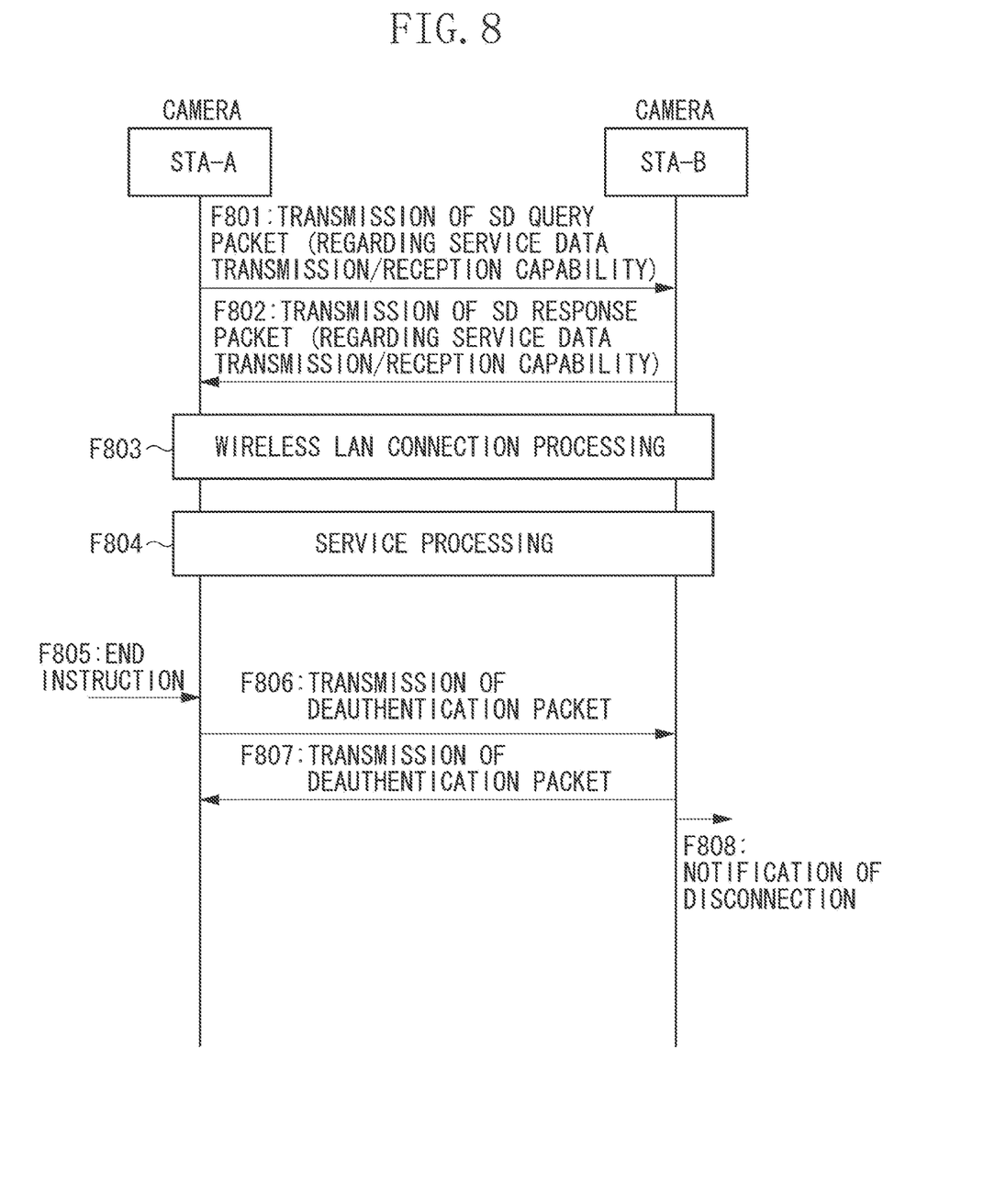
FIG. 8 is an operation sequence diagram according to a second exemplary embodiment of the present invention.

FIG. 8 is an example of an operation sequence diagram of a service on the application layer. In this service, the transfer direction of the service data is bidirectional.

The STA-A searches for the STA-B using the service discovery processing defined by the Wi-Fi Direct specification. Specifically, the STA-A transmits a SD query packet which specifies a service data transmission/reception capability to the STA-B (F801). In this example, it is assumed that the STA-B supports the service data transmission/reception capability specified in the SD query packet transmitted from the STA-A. Thus, the STA-B adds information indicating that the STA-B supports the service data transmission/reception capability to a SD Response packet, and transmits the SD Response packet to the STA-A (F802).

Since the transfer direction of the service data has been determined in F801 and F802, wireless LAN connection processing is performed (F803). In the wireless LAN connection processing, a predetermined protocol for determining a Group Owner and a Client is executed by the control of the Wi-Fi Direct control unit 203. As a result of the execution of the protocol, one apparatus is determined to serve as a Group Owner and the other apparatus is determined to serve as a Client. The Group Owner provides the Client with communication parameters, and the apparatuses are connected to each other by wireless LAN. Further, if the Group Owner has already been determined before the connection processing is performed, the Group Owner which has already been operating as a Group Owner provides the Client with communication parameters, and the apparatuses are connected to each other by wireless LAN. When the connection on the wireless LAN layer has been completed, the service on the application layer is executed (F804).

If the transfer direction of the service data is bidirectional, the disconnection processing is executed when the user issues an instruction to end the service by performing an operation. More specifically, the user issues a service end instruction to the STA-A by operating the operation unit 109 (F805). Then, the STA-A transmits a deauthentication packet to the STA-B (F806). When receiving the deauthentication packet, the STA-B transmits a deauthentication packet to the STA-A as a response (F807). Further, the STA-B which has received the deauthentication packet displays, on the display unit 105, a message informing the user that the service on the application layer has ended and the wireless LAN has been disconnected (F808).

On the other hand, if the transfer direction of the service data of the service on the application layer is unidirectional, the completion of the service can be determined when either the transmission apparatus, which is on the transmitting side of the service data, or the reception apparatus, which is on the receiving side of the data, determines the completion of the data transfer. The communication apparatus that has determined the completion of the service starts the disconnection processing of the wireless LAN. In the second exemplary embodiment, similarly to the first exemplary embodiment, if the service is the image transfer service, the service is determined to be completed when the STA-A, which is a transmission apparatus for transmitting image data or an image file as the service data, has completed transmission of the service data. If the service is the geotag acquisition service, the service is determined to be completed when the STA-A, which acquires GPS information as the service data, determines that the STA-A has acquired the GPS information which the STA-A has requested the STA-B to transmit.

Further, if the service is the simultaneously-captured image sharing service, both the STA-A and the STA-B serve as service data transmission apparatus as well as service data reception apparatuses, and the transfer direction of the service data is determined to be bidirectional.

Figure 9:
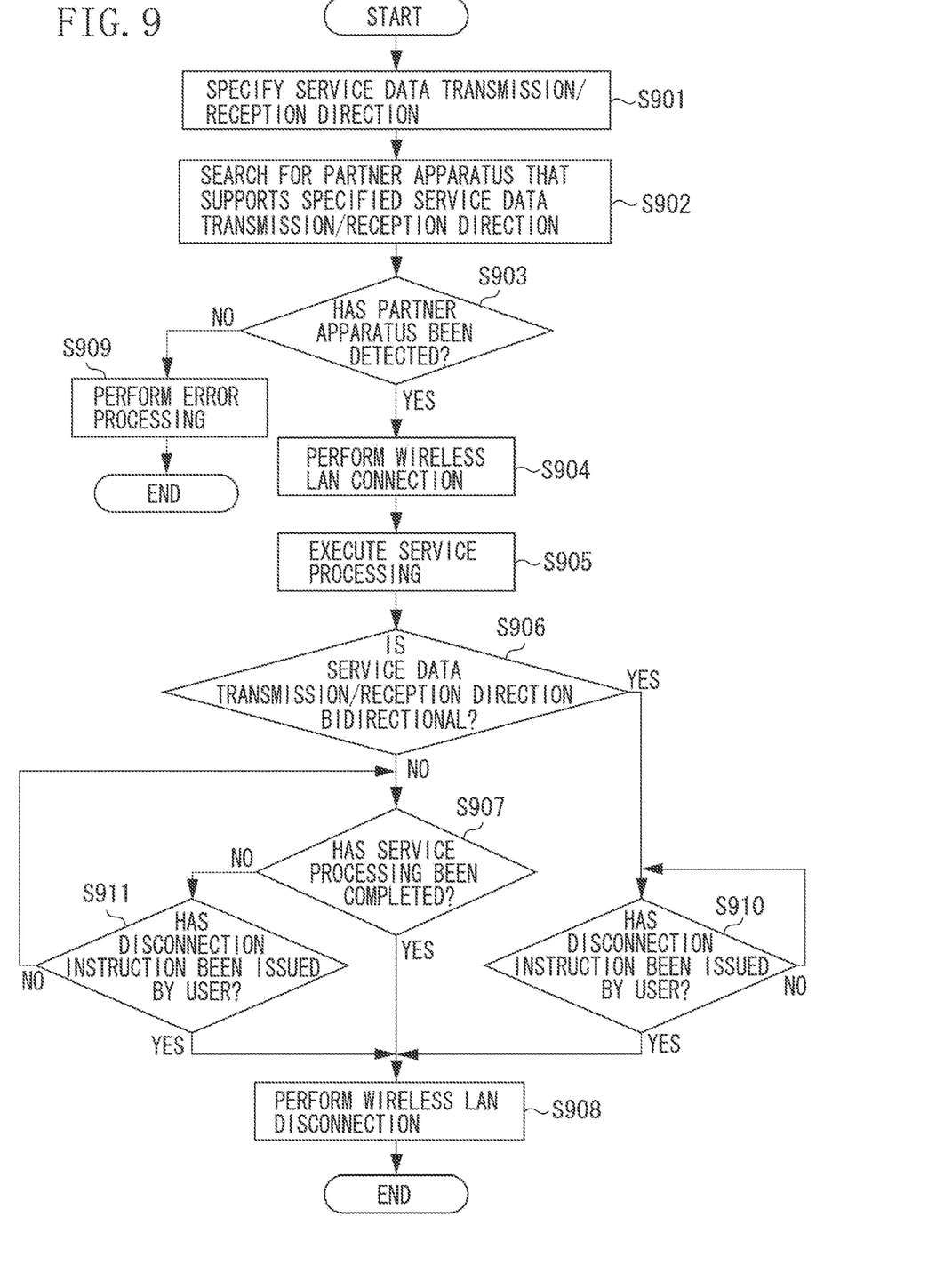
FIG. 9 is a flowchart illustrating operation performed by the communication apparatus according to the second exemplary embodiment.

FIG. 9 is a flowchart illustrating an example of the operation performed by the STA-A described with reference to FIG. 8. In step S901, the user specifies the transmission/reception direction of the service data. Here, there are three patterns regarding the transmission/reception direction of the service data: transmission of the data from the STA-A to STA-B, transmission of the data from the STA-B to the STA-A (the STA-A receives the data transmitted from the STA-B), and bidirectional transmission/reception of the data between the STA-A and the STA-B.

In step S902, the control unit 102 searches for any available partner apparatus that supports the specified service transmission/reception direction.

In step S903, the control unit 102 determines whether the partner apparatus that supports the specified service has been detected. If such a partner apparatus does not exist (NO in step S903), the processing proceeds to step S909. In step S909, the control unit 102 performs error processing. Then, the processing is ended.

On the other hand, in step S903, if the partner apparatus that s the specified service has been detected (YES in step S903), the processing proceeds to step S904. In step S904, the control unit 102 performs the wireless LAN connection processing. In step S905, the control unit 102 executes the service processing on the application layer. If the service is the image transfer service, the processing is continued until transfer of the image data or image file specified by the user is completed. If the service is the geotag acquisition service, the processing is continued until all the GPS information necessary for the images stored in the camera is acquired. In other words, the processing is continued until transfer of all the service data from the apparatus on the transmitting side to the apparatus on the receiving side is completed.

In step S906, the control unit 102 determines whether the transfer direction of the service data is bidirectional. In this example, if the service is the image transfer service or the geotag acquisition service, the transfer direction of the service data is unidirectional (NO in step S906). Therefore, the processing proceeds to step S907. In step S907, the control unit 102 of the STA-A determines whether the service processing has been completed. If the control unit 102 determines that transmission or reception of the service data has been completed (YES in step S907), the processing proceeds to step S908. In step S908, the control unit 102 disconnects the wireless LAN, and then the processing is ended. Even when the image transfer service or the geotag acquisition service is performed (NO in step S906), if a disconnection instruction has been issued by the user before the completion of the service (YES in step S911), then in step 908, the wireless LAN is disconnected and the processing is ended.

In step S906, if the transmission/reception direction of the service data is bidirectional (YES in step S906), the processing proceeds to step S910. In step S910, the control unit 102 determines whether a disconnection instruction has been issued by the user. If a disconnection instruction has been issued by the user (YES in step S910), the processing proceeds to step S908. In step S910, if a disconnection instruction has not been issued by the user (NO in step S910), the control unit 102 continues the service processing on the application layer.

As described above, in the second exemplary embodiment, whether the wireless LAN disconnection processing is to be automatically performed after the completion of the service or whether the apparatus is to wait for a disconnection instruction or an end instruction from the user can be autonomously determined according to the transfer direction of the service data.

Although the geotag acquisition service, the image transfer service, and the simultaneously-captured image sharing service are described as examples of the service according to the second exemplary embodiment, the service is not limited thereto. The geotag acquisition service and the image transfer service are used as examples of the service having a clear end condition. The simultaneously-captured image sharing service is used as an example of the service which is determined to be completed by the user.

For example, if a Push service is used, the completion of the service can be determined when the transmission apparatus for transmitting the service data determines that transmission of the service data has been completed. Further, if a Pull service is used, the completion of the service can be determined when the reception apparatus for receiving the service data determines that receiving or acquiring the service data has been completed. Furthermore, the service data is not limited to image data or an image file of a still image or a moving image, or position information. The service data may be file data of a document file or print data.

As described above, according to each of the above-described embodiments, if a communication apparatus operates as a service data transmission apparatus or a service data reception apparatus, a connection with a communication partner apparatus is terminated in response to completion of transmission or reception of the service data. On the other hand, if a communication apparatus operates as both a service data transmission apparatus and a service data reception apparatus, a connection with a communication partner apparatus is terminated in response to a user operation. Thus, if a communication apparatus can identify the end condition for a service in advance, the communication apparatus can terminate a connection with a communication partner apparatus in response to completion of the service, so that unnecessary connections can be reduced. Reducing unnecessary connections can cut down power consumption. Further, the network resources can be efficiently used. Furthermore, if the end condition for a service cannot be identified or is difficult to be identified in advance, a disconnection from the communication partner apparatus before completion of the service can be prevented.

Another exemplary embodiment of the present invention will be described.

In the above-described exemplary embodiments, examples using a wireless LAN conforming to IEEE 802.11 have been described. However, the exemplary embodiments of the present invention can be implemented using other wireless medium such as wireless universal serial bus (USB), multiband-OFDM alliance (MBOA), Bluetooth (registered trademark), ultra wide band (UWB), and ZigBee. Further, the embodiments of the present invention can also be implemented using a wired communication medium such as wired LAN. The UWB includes Wireless USB, Wireless 1394, and Wireless Networking (WINET).

Furthermore, in the above-described exemplary embodiments, examples using Wi-Fi Direct have been described. However, the exemplary embodiments of the present invention can be applied to a method where a predetermined protocol for determining whether to serves as a master unit or a slave unit is performed between apparatuses. Further, the exemplary embodiments can be applied to a method where a predetermined protocol for determining whether to serve as a server or a client is performed between apparatuses, a method for determining a base station and an apparatus to be connected thereto by wireless LAN, and the like.

The exemplary embodiments of the present invention can also be realized by a computer program code. In such a case, a storage medium storing a program code of software for implementing the functions of the above-described exemplary embodiments is supplied to a system or an apparatus, and a computer (or central processing unit (CPU) or micro processing unit (MPU)) in the system or the apparatus reads out and executes the program code stored in the storage medium. In this case, the program code read from the storage medium itself implements the functions of the above-described exemplary embodiments. Thus, the storage medium storing the program code is an exemplary embodiment of the present invention. As the storage medium for providing the program code, a flexible disk, a hard disk, an optical disk, a magneto-optical disk, a compact disc read-only memory (CD-ROM), a CD recordable (CD-R), a magnetic tape, a non-volatile memory card, a ROM, or a digital versatile disc (DVD) may be used, for example.

Further, the functions of the above-described exemplary embodiments can be implemented not only by the computer executing the program code, but also by an operating system (OS), which runs on the computer, executing some or all of actual processes based on an instruction of the program code. Furthermore, the functions of the above-described exemplary embodiments can be implemented in such a way that the program code read from the storage medium is written into a memory provided in an function expansion board inserted into the computer or a function expansion unit connected to the computer, and a CPU provided in the function expansion board or the function expansion unit performs some or all of actual processes based on an instruction of the program code, According to the exemplary embodiments of the present invention, a communication apparatus can terminate a connection with a communication partner apparatus according to the service used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a connection unit configured to establish a wireless connection with another communication apparatus in compliance with IEEE802.11 series standards; and
a disconnection unit configured to:
1) in a case where the wireless connection has been established by the connection unit according to a first operation performed by a user, send a deauthentication packet to disconnect the wireless connection in compliance with IEEE802.11 series standards with the other communication apparatus according to an instruction to disconnect the wireless connection from the user, and
2) in a case where the wireless connection has been established by the connection unit according to a second operation by the user different from the first operation, send a deauthentication packet to disconnect the wireless connection in compliance with IEEE802.11 series standards with the other communication apparatus upon completion of an image processing designated by the user without receiving the instruction to disconnect the wireless connection from the user.

2. The communication apparatus according to claim 1, wherein
the communication apparatus performs a search for another communication apparatus capable of executing the designated image processing, and
the connection unit establishes the wireless connection with the other communication apparatus according to the communication apparatus detecting the other communication apparatus by the search.

3. The communication apparatus according to claim 2, wherein, in a case where another communication apparatus capable of executing the designated image processing is not detected by the search, the communication apparatus performs error processing.

4. The communication apparatus according to claim 2, wherein the search is performed by using a Service Discovery Query signal.

5. The communication apparatus according to claim 1, wherein the communication apparatus executes Group Owner (GO) Negotiation defined by a Wi-Fi Direct specification with the other communication apparatus when the connection unit establishes the wireless connection with the other communication apparatus.

6. The communication apparatus according to claim 1, wherein the first operation is an operation for performing wireless connection in order to execute the image processing in which a transfer direction of data to be used for the image processing is bidirectional, and
wherein the second operation is an operation for performing wireless connection in order to execute the image processing in which the transfer direction of data to be used for the image processing is unidirectional.

7. A method comprising:
establishing a wireless connection with another communication apparatus in compliance with IEEE802.11 series standards; and
performing a disconnecting operation, wherein
1) in a case where the wireless connection has been established by the connection unit according to a first operation performed by a user, sending a deauthentication packet to disconnect the wireless connection in compliance with IEEE802.11 series standards with the other communication apparatus according to an instruction to disconnect the wireless connection from the user, and
2) in a case where the wireless connection has been established by the connection unit according to a second operation by the user different from the first operation, sending a deauthentication packet to disconnect the wireless connection in compliance with IEEE802.11 series standards with the other communication apparatus upon completion of an image processing designated by the user without receiving the instruction to disconnect the wireless connection from the user.

8. A non-transitory computer readable storage medium storing instructions which, when executed, cause a communication apparatus to perform a process comprising:
establishing a wireless connection with another communication apparatus in compliance with IEEE802.11 series standards; and
performing a disconnecting operation, wherein
1) in a case where the wireless connection has been established by the connection unit according to a first operation performed by a user, sending a deauthentication packet to disconnect the wireless connection in compliance with IEEE802.11 series standards with the other communication apparatus according to an instruction to disconnect the wireless connection from the user, and
2) in a case where the wireless connection has been established by the connection unit according to a second operation by the user different from the first operation, sending a deauthentication packet to disconnect the wireless connection in compliance with IEEE802.11 series standards with the other communication apparatus upon completion of an image processing designated by the user without receiving the instruction to disconnect the wireless connection from the user.

* * * * *